United States Patent [19]

Galan

[11] Patent Number: 4,623,229

[45] Date of Patent: Nov. 18, 1986

[54] ARTICULATED LASER ARM

[75] Inventor: Louis Galan, Ann Arbor, Mich.

[73] Assignee: Photon Sources, Inc., Livonia, Mich.

[21] Appl. No.: 537,150

[22] Filed: Sep. 29, 1983

[51] Int. Cl.$^4$ .............................................. G02B 5/08
[52] U.S. Cl. .................... 350/623; 350/610;
    350/632; 362/259; 219/121 LC; 219/121 LV;
    219/121 LY
[58] Field of Search ............ 350/574, 573, 543, 500,
    350/577, 632, 610, 622, 623; 372/107; 219/121
    FS, 121 LQ, 121 LR, 121 LV, 121 LY, 121 LC,
    121 LD, 121 LG, 121 LN; 128/303.1, 395–398;
    901/41, 42

[56] References Cited

U.S. PATENT DOCUMENTS

| | | | |
|---|---|---|---|
| 3,383,491 | 5/1968 | Muncheryan | 219/121 LR |
| 3,913,582 | 10/1975 | Sharon | 128/303.1 |
| 3,913,820 | 10/1975 | Valentine | 901/42 |
| 3,986,768 | 10/1976 | Peters et al. | 350/610 |
| 4,249,533 | 2/1981 | Komiya | 128/303.1 |
| 4,312,622 | 1/1982 | Favareto | 901/42 |
| 4,539,462 | 9/1985 | Plankenhorn | 350/623 |

FOREIGN PATENT DOCUMENTS 2120202 11/1983 United Kingdom ........ 219/121 LG

*Primary Examiner*—John K. Corbin
*Assistant Examiner*—Vincent J. Lemmo
*Attorney, Agent, or Firm*—Stephenson and Boller

[57] ABSTRACT

An articulated arm for conducting the beam of a laser to a point of utilization which moves relative to the laser. In the preferred embodiment the articulated arm is supported in a generally vertically depending manner from a stationary laser. The articulated arm terminates in a focusing clamp assembly which is positioned by an industrial robot. The articulated arm following the motions of the robot. The articulated arm comprises joints through which the laser beam is conducted and which contain mirror assemblies for changing the direction of the laser beam as it passes through each joint. A joint may include a rotary coupling member on a main body providing relative rotation of the axis of one of the incident and reflected laser beams about the axis of the other. The mirror assemblies include adjustable shim mechanisms which provide for the precision adjustment of the mirrors to secure alignment of the incident and reflected laser beam along the intersecting path segments through each joint. Each mirror is replacably mounted on its joint by means of a coolant distributor assembly disposed against the mirror and providing cooling for the mirror.

23 Claims, 14 Drawing Figures

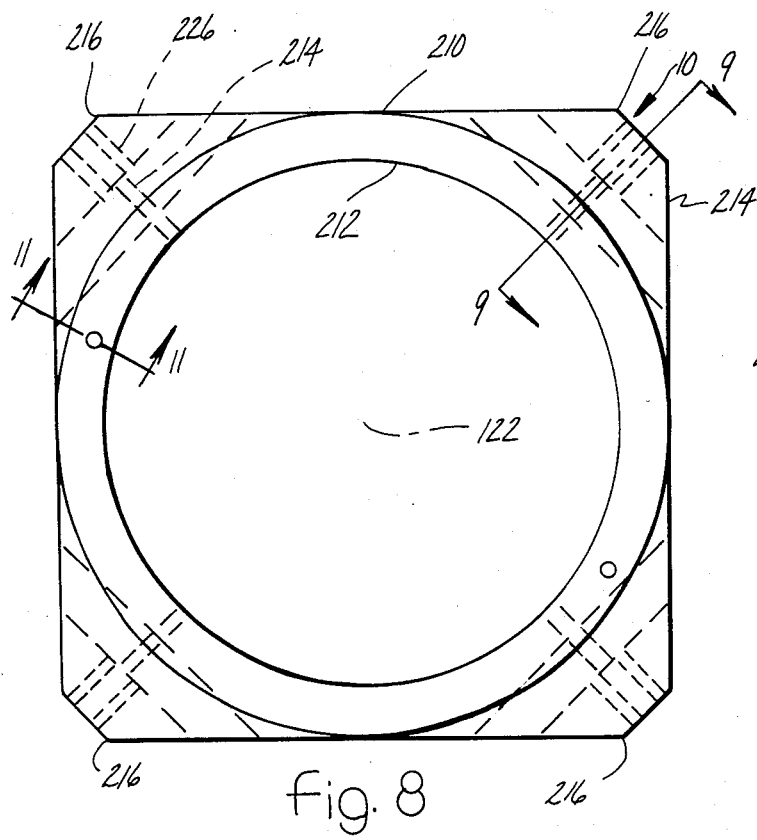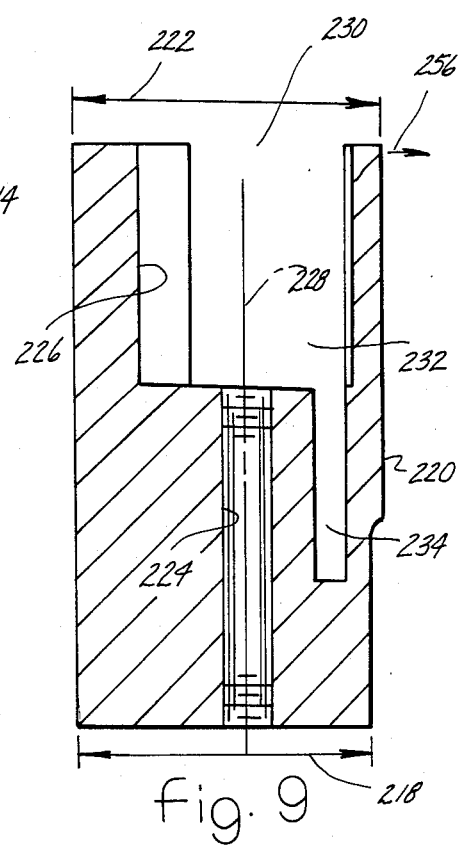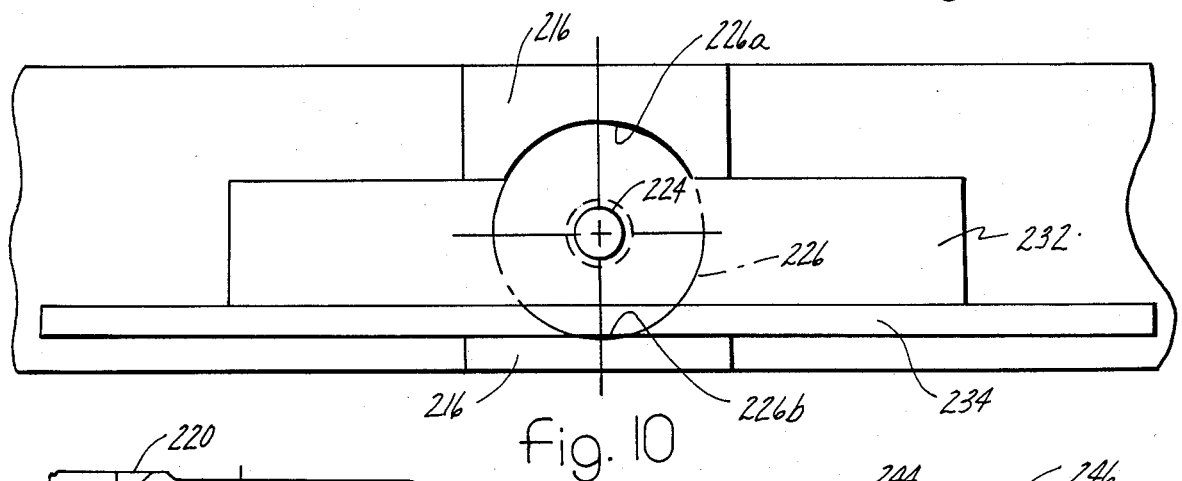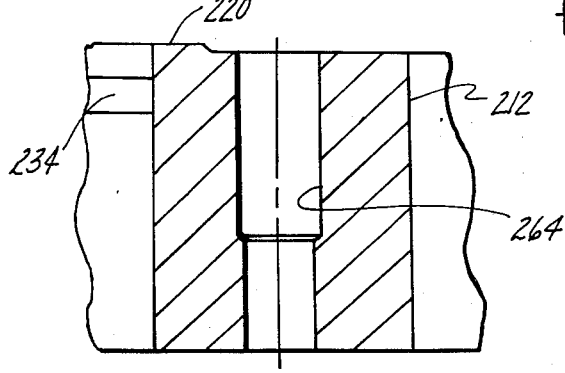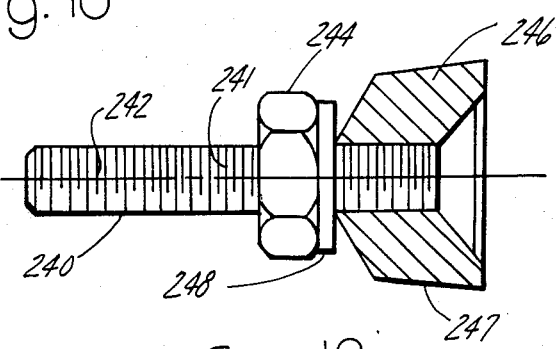

ARTICULATED LASER ARM

BACKGROUND AND SUMMARY OF THE INVENTION

This invention relates to an articulated arm for conducting the beam from a laser to a point of utilization which moves relative to the laser. The invention relates to the general organization and arrangement of the laser arm and to certain components thereof including joints, mirrors and focusing clamp.

Certain types of lasers, $CO_2$ lasers for example, are utilized for industrial purposes such as machining, joining, cutting, etc. In general, industrial applications of lasers involve relative motion between the laser beam and a workpiece. Lasers of the industrial type are generally quite massive, and therefore it is generally undesirable to bodily move such a laser with respect to a workpiece.

One alternative procedure involves moving the workpieces in relation to the laser beam but this can be difficult if the workpieces themselves are massive or not conveniently grippable for movement.

Another alternative for effecting relative movement between a laser beam and a workpiece comprises a system of mirrors in which the mirrors are operated by various controls so as to deflect the laser beam in proper fashion onto the workpiece. For example, a common technique is to have an oscillating, or rocking, mirror powered by a servo motor which sweeps a workpiece with laser beam pulses being synchronized with the operation of the mirror so that they are correctly directed onto the workpiece.

It is also very important that the proper distance relationship be maintained so that the laser beam is focussed exactly at the desired point of utilization. Departures from exact focussing yield less than optimal results.

The emergence of industrial robots offers the potential for significant productivity improvements in the manufacture of many articles. The more sophisticated robots are highly versatile, having multiple degrees of freedom (i.e. axes of motion) so as to be capable of operating on workpieces in a number of varied ways. Their dexterity, and the speed and accuracy with which they can be operated, render industrial robots potentially suitable for application to the manufacture of a wide variety of articles requiring cutting, joining, drilling and similar types of operations. Yet industrial laser manufacturing procedures have generally not seemed compatible with industrial robots because of the inherent massiveness of such lasers.

The present invention is directed to an articulated arm which can be used to conduct the laser beam from a laser to a point of utilization which moves in three dimensions relative to the laser. Accordingly the invention is well suited for endowing a robot with a laser operating capability. The robot's speed, dexterity, and accuracy can position the operating point of the articulated laser arm to desired locations thereby avoiding the problems characteristic of prior procedures as described above.

The articulated laser arm of the present invention comprises a number of important aspects. For one, the general organization and arrangement of the laser arm is unique in that it is adapted to passively follow the motion of the robot in a manner which does not impair the speed and accuracy of the robot during its operations on a workpiece. In other words, the articulated laser arm has an organization and arrangement which can follow the complex manipulations of the robot in a manner which imposes negligible loading on the robot.

Another feature of the invention relates to the construction of the joints of the articulated laser arm. The joints are configured in identical assemblies which can be cascaded together with or without intervening tubular sections. The joints are readily interchangeable and allow different geometries to be readily realized depending upon the particular requirements of any given design.

Moreover, each joint comprises a new and unique mirror assembly which reflects the laser beam as it passes through the joint. Each mirror assembly is mounted in such a manner that very precise adjustments can be made to accurately align the incident and reflected laser beam along desired directions of travel through the articulated arm. Furthermore, the mirror assemblies are cooperatively associated with a fluid cooling system with a coolant distributor assembly being used to retain a mirror element within a frame of the mirror assembly. In this way the mirror element is exposed for efficient cooling, yet the construction and arrangement permits the convenient replacement of a mirror element by removal of the coolant distributor assembly.

Still another feature is the focusing clamp which forms the point of utilization of the laser beam. The focusing clamp has opposed jaw elements which are operated onto opposite sides of a workpiece, such as for example onto a seam which is being laser welded. The focusing clamp has an equalizing feature which allows the laser beam to be precisely focused at the point of utilization. Thus, it is not necessary that the workpiece and the robot be precisely relatively positioned since any departures within a certain range from the precise position are taken up by the equalizing feature of the focusing clamp thereby ensuring precise placement of the focussed laser beam at the desired point of utilization.

With the present invention advantages of industrial robots and industrial lasers may be conjointly attained in manufacturing operations with meaningful improvements in productivity, performance, and quality of manufactured products.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 8 is an enlarged axial view taken in the direction of arrows 8—8 in FIG. 5 of one element shown by itself.

FIG. 9 is an enlarged sectional view taken in the direction of arrows 9—9 in FIG. 8.

FIG. 10 is an enlarged view looking in the direction of arrow 10 in FIG. 8.

FIG. 11 is a fragmentary sectional view taken in the direction of arrows 11—11 in FIG. 8 and enlarged.

FIG. 12 is an enlarged view, partly in section, of another of the elements used in the assembly of FIG. 5.

DESCRIPTION OF THE PREFERRED EMBODIMENT

Figure 1:
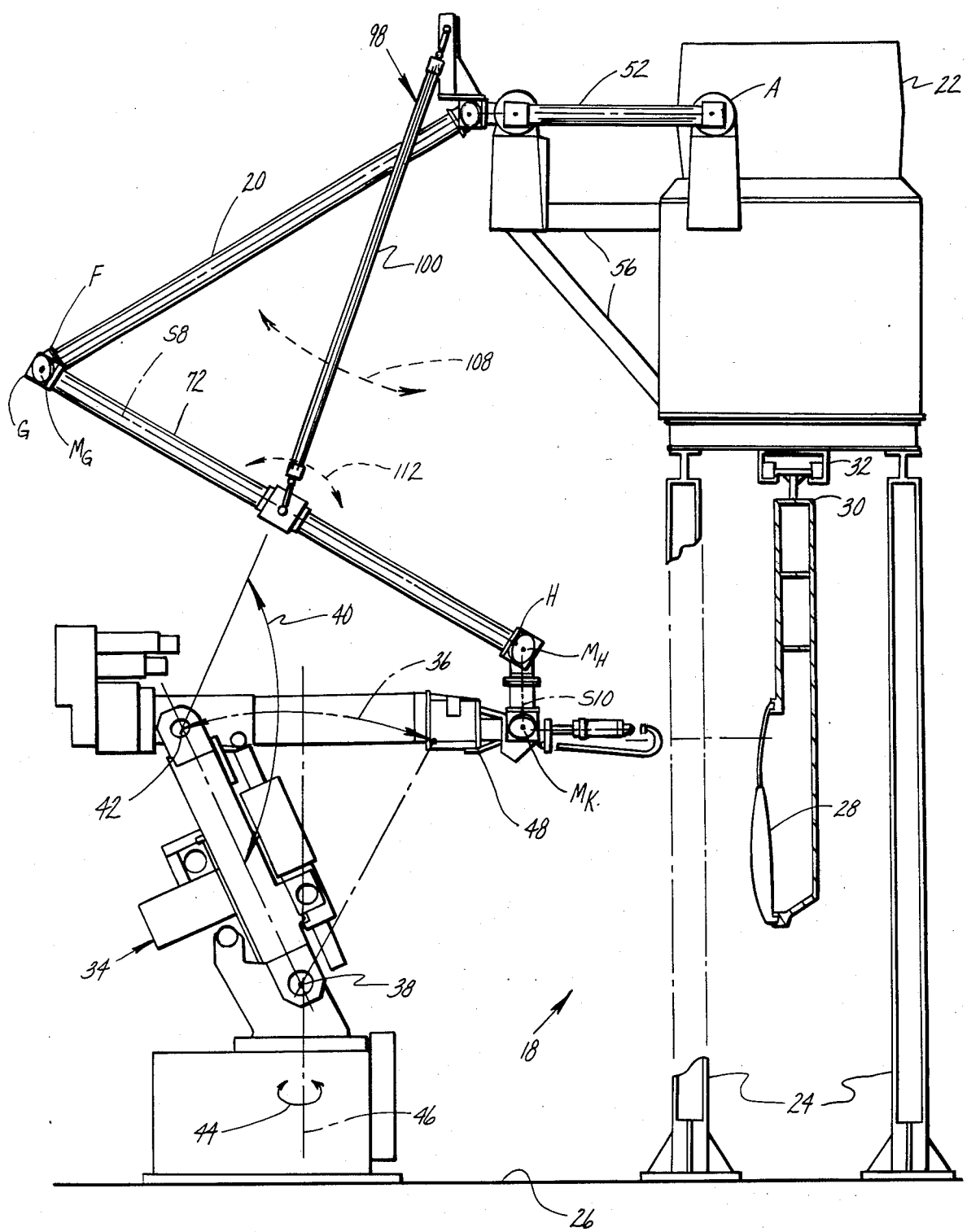
FIG. 1 is a right side elevational view of a work station containing an articulated laser arm embodying principles of the present invention.

FIG. 1 illustrates a work station 18 containing an articulated arm 20 embodying principles of the present invention. It is to be understood that the illustrated work station and embodiment of articulated arm are exemplary for the purpose of disclosing principles of the invention and that the invention may be practiced in other embodiments and work stations.

Work station 18 coprises a laser 22 which is supported via a series of uprights 24 in spaced relation to a floor 26. Workpieces 28 are conveyed generally horizontally to and from work station 18 via trolleys 30 which run along a track 32. The drawing figure illustrates a single workpiece and trolley at the work station.

Laser arm 20 is manipulated by means of a robot 34 to perform operations on each workpiece 28 which is brought to work station 18.

Robot 34 comprises multiple degrees of freedom in its motion. The illustrated robot possesses the following motion capabilities: a shoulder swing indicated by the reference numeral 36 about a horizontal axis 38; an elbow swing indicated by the reference numeral 40 about a horizontal axis 42; a turning swing 44 about a vertical axis 46: and pitch, yaw and roll motions about a wrist 48. An example of a robot having this capability is the model T3-776 Cincinnati millacron robot.

Laser 22 is the T-1000 model manufactured by the common assignee Photon Sources, Inc. That laser is an industrial $CO_2$ laser having a power rating in the kilowatt range.

Figure 3:
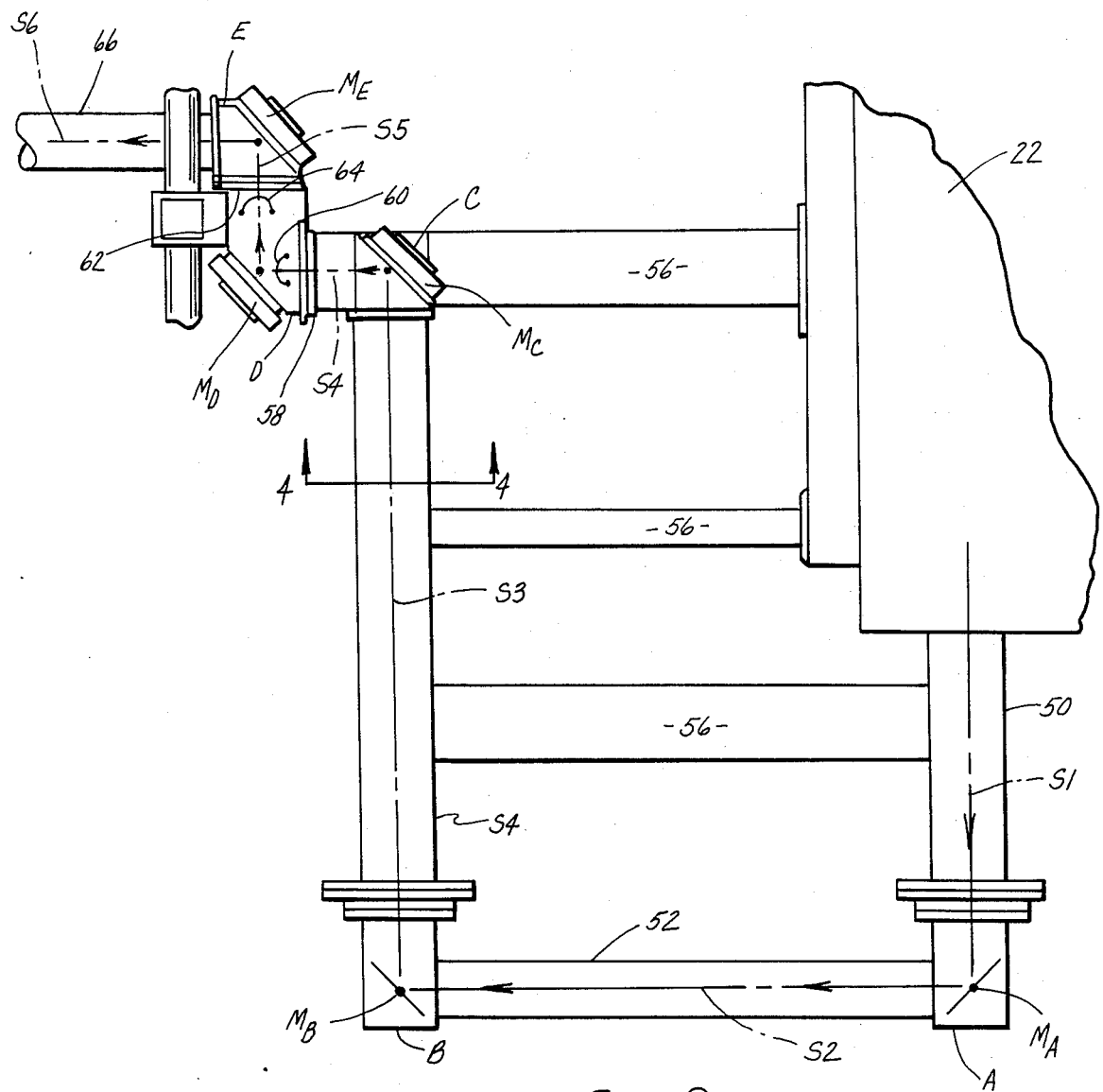
FIG. 3 is a partial top plan view slightly enlarged of a portion of FIG. 1, portions having been broken away.
Figure 4:
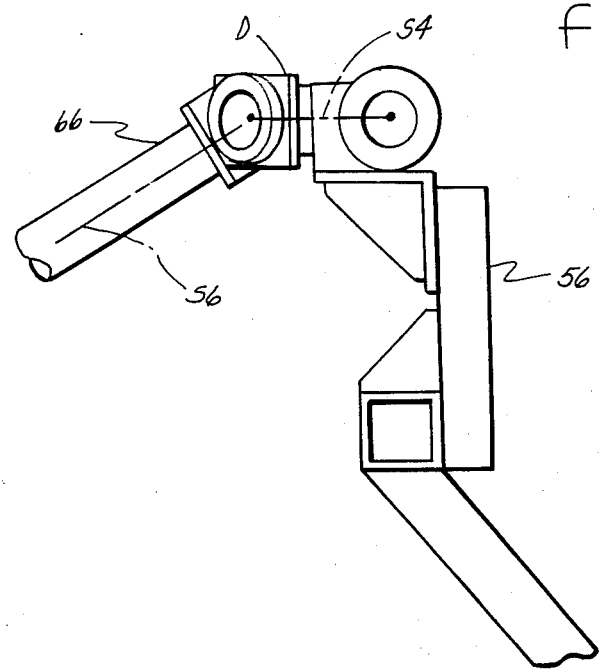
FIG. 4 is a partial vertical sectional view taken in the direction of arrows 4—4 in FIG. 3.

The output laser beam is delivered from laser 22 along a path segment S1 through a tube 50 (see FIG. 3) to a right angle elbow identified by the reference letter A. Elbow A contains a mirror $M_A$ arranged at 45° to the incident laser beam to reflect it at a right angle to the direction of incidence. The reflected laser beam passes along a path segment S2 through a tube 52 to a right angle elbow B also containing a mirror $M_B$. The beam is reflected by mirror $M_B$ to travel along a path segment S3 through a tube 54 to a joint assembly identified by the reference letter C and containing a mirror $M_C$.

The elbows A, B and the joint assembly C are stationarily mounted by means of a framework structure 56 to a second structure supporting laser 22. The mirrors of elbows A, B and joint assembly C are provided with certain adjustment and cooling capabilities as will be explained in greater detail in the ensuing description. The mirror $M_C$ of joint assembly C reflects the incident laser beam at a right angle along a path segment S4, but joint assembly C comprises a tubular rotary part 58 which provides for rotation as indicated by the arrow 60 about the path segment S4.

The rotary part 58 attaches to another joint assembly identified by the reference letter D. This joint assembly contains a mirror assembly $M_D$ which reflects the incident laser beam at 90° along the laser beam path segment S5.

Joint assembly D also has a tubular rotary part 62 which is rotatable about the laser beam path segment S5 in the sense indicated by the arrow 64.

A still further joint assembly identified by the reference letter E is affixed to rotary part 62 of joint assembly D and comprises a mirror assembly $M_E$ which reflects the incident laser beam at a right angle along the path segment identified by the designation S6. It will be observed that the laser beam path segments S1, S2, S3, S4 and S5 are illustrated in the drawing FIGS. 1, 2, and 3 as lying in a common horizontal plane. The illustrated construction will always result in the segments S1, S2, S3 and S4 being in such a common horizontal plane, but the segment S5 may be displaced out of this common plane at joint assembly D because of the rotational capability 60 afforded by the rotary part 58 of joint assembly C.

As the laser beam leaves joint assembly E along the segment S6, it is confined within a tube 66 which attaches to joint assembly E. As can be seen from consideration of FIGS. 1 through 4, tube 66 extends downwardly and outwardly at an angle from joint assembly E.

A still further joint assembly F attaches to the end of tube 66 opposite joint E. Joint assembly F has a rotatable coupling 68 with a further joint assembly G to provide a rotational connection between the two in the sense indicated by the double headed arrow 70. Joint assembly F contains a mirror $M_F$ which reflects the incident laser beam 90° from joint assembly F to joint assembly G along the laser beam path segment S7. Joint assembly G also contains a mirror $M_G$ which reflects the incident laser beam 90° along the laser beam path segment S8.

Figure 2:
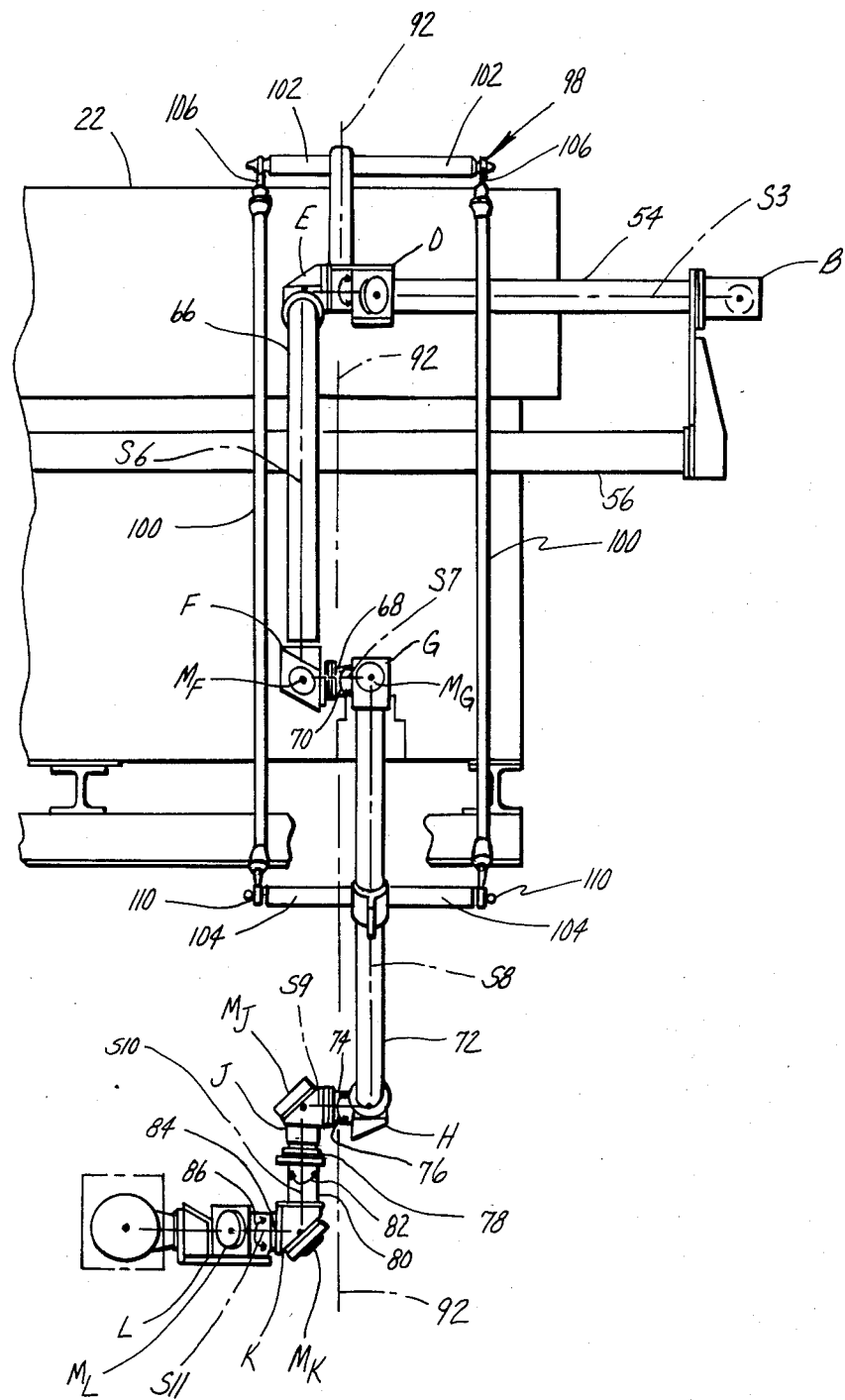
FIG. 2 is a partial front elevational view of FIG. 1, portions having been broken away.

The laser beam path segment S8 is enclosed by a tube 72. It can be seen from consideration of FIG. 1 that tube 72 and tube 66 are angularly related but with the two being slightly offset from each other as shown in FIG. 2. The tube 72 extends downwardly but back inwardly relative to laser 22.

Another joint assembly H attaches to the end of tube 72 opposite joint assembly G and contains a mirror assembly $M_H$ which reflects the incident laser beam 90° along the laser beam path segment S9. The joint includes a rotary coupling 74 so that rotation in the sense of the double headed arrow 76 is permitted between joint assembly H and a further joint assembly J which reflects the incident laser beam from segment S9 90° to the path segment S10.

The joint assembly J, which contains a mirror assembly $M_J$, comprises a rotary coupling 78 to a tube 80 which extends to a still further joint assembly K. This permits rotation between the joint assemblies J and K in the sense indicated by the double headed arrow 82. The joint assembly K contains a mirror assembly $M_K$ which reflects the incident laser beam from segment S10 90° to the path segment S11.

Joint assembly K connects to a further joint assembly L through a rotary coupling 84 allowing rotation in the sense indicated by the double headed arrow 86 between joint assemblies K and L. As can be best seen in FIG. 14 joint assembly L has a rotary output coupling 88 whose use will be explained in greater detail in connection with the description of FIG. 14.

Joint assembly L contains a mirror assembly $M_L$ which reflects the incident laser beam from segment S11 90° to segment S12. In the present embodiment the point of utilization of the laser beam occurs along segment S12 at a location spaced from mirror $M_L$ of joint assembly L as will become more apparent from the later description of FIGS. 13 and 14.

As can be appreciated from the structure thus described the laser arm has an articulation capability by virtue of the various rotational joints which have been provided. The articulation capability allows the last joint assembly L to follow the motion of the robot over the latter's several degrees of freedom as described above.

The articulated arm has an advantageous general organizational arrangement in that the rotary parts 74, 68 and 62 are so arranged that a common imaginary plane 92 can be passed through all three over the various positions of articulation.

A still further advantageous attribute involves the provision of a counterbalance mechanism 98 cooperatively associated with the articulated laser arm structure just described. Counterbalance mechanism 98 comprises a pair of spaced apart bunges (counterbalance springs) 100 on opposite sides of the tubes 66, 72. The bunges are operatively coupled at opposite ends to brackets 102, 104 respectively, which are in turn affixed to the stationary part of joint assembly D and to tube 72 respectively. More specifically, the upper ends of the bunges are secured in suitable swivel joints 106 to allow the bunges to move in an arc indicated by the reference numeral 108 in FIG. 1. The lower ends of the bunges are affixed to the ends of bracket 104 in suitable swivel joints 110 allowing the bunges to pivot about their connections with tube 72 in the sense indicated by the arrow 112 in FIG. 1. The bunges are of course extensible and contractible in length as the angle between the tubes 66 and 72 as viewed in FIG. 1 changes. As can be seen in FIG. 1 the lower ends of the bunges are secured approximately at the midpoint of the tube 72. The attachment point can be changed depending on the anticipated range of operation of the robot. The bunges comprise a suitable extendable means which yieldably stretch as the bunges are extended in length to provide a counterbalancing force which is effective over the expected operating range of the articulated arm.

Figure 5:
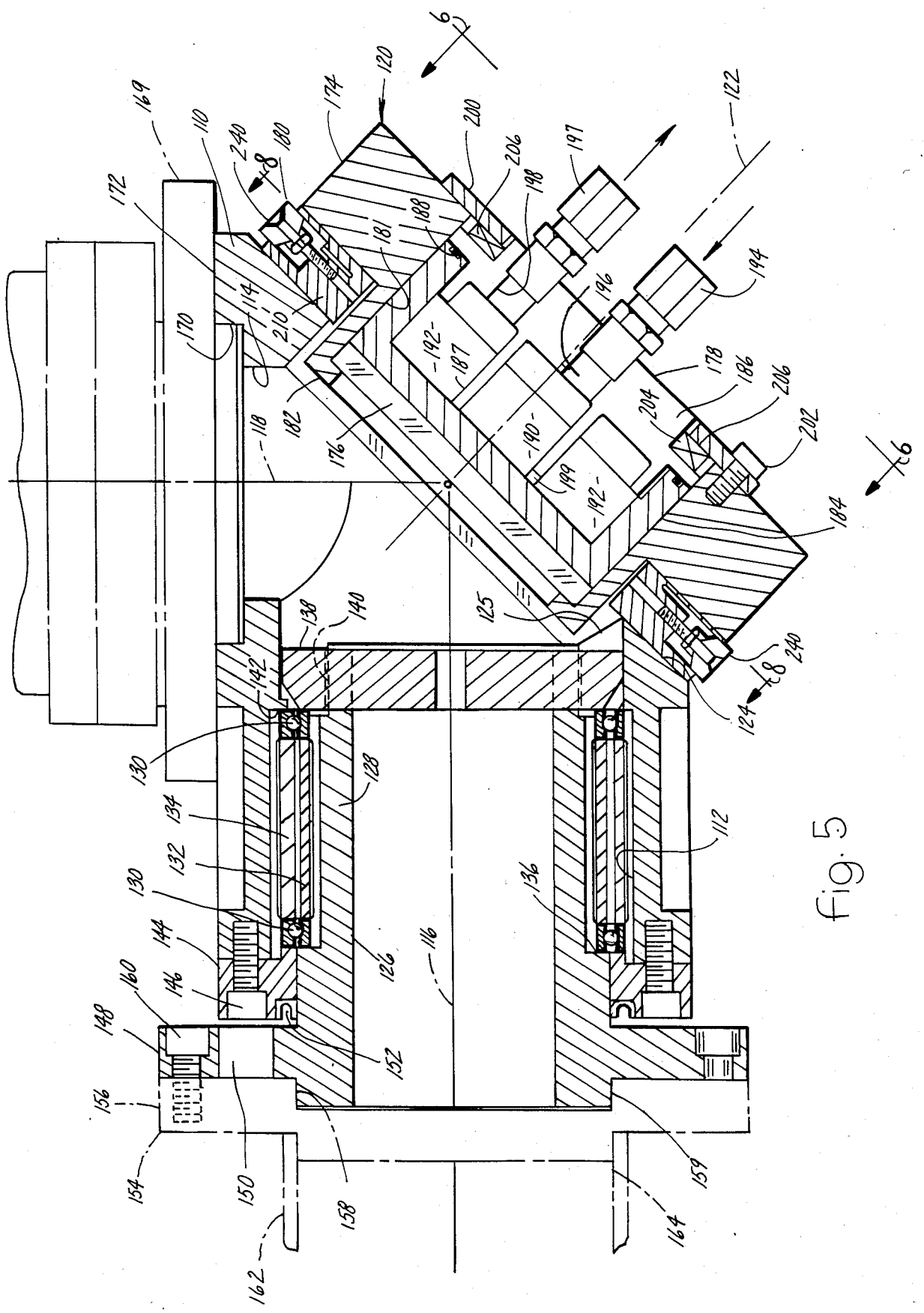
FIG. 5 is a longitudinal sectional view through a representative portion of the laser arm of FIG. 1, certain elements being illustrated in broken lines.
Figure 6:
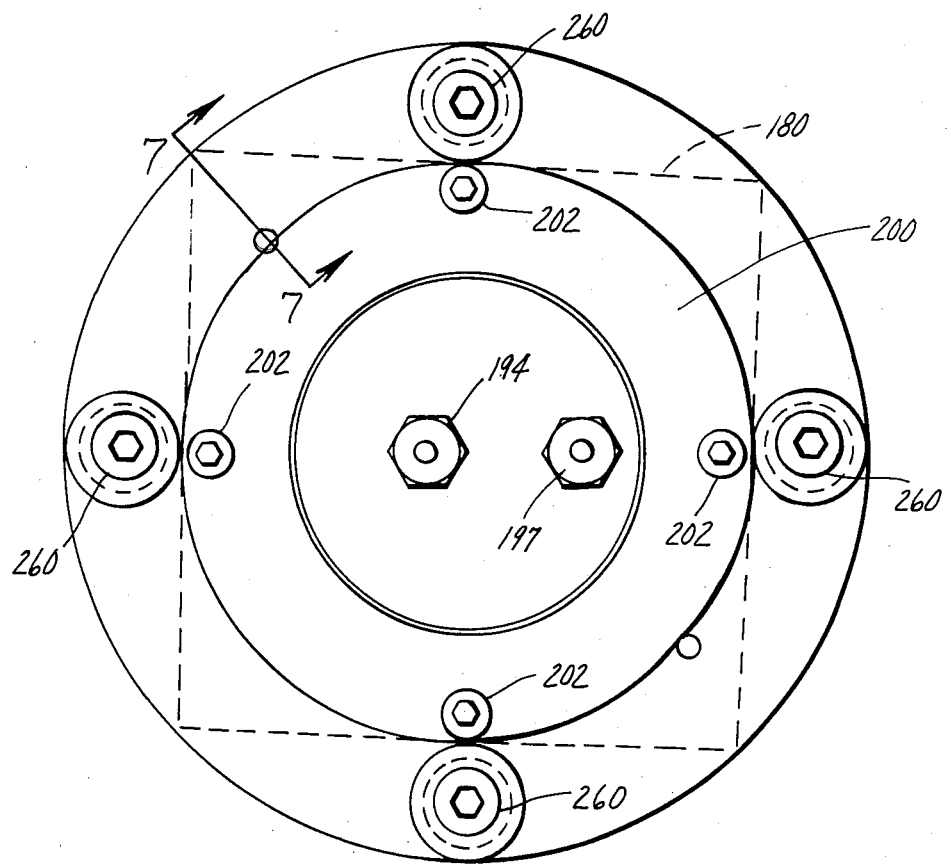
FIG. 6 is an axial end view as taken in the direction of arrows 6—6 in FIG. 5.

FIGS. 5 and 6 illustrate details of one of the articulated arm joint assemblies. The joint assembly comprises a main body 110 having a bore comprising two bore segments 112, 114 disposed in intersecting relation with their respective axes 116, 118 at a right angle. A mirror assembly 120 having an axis 122 mounts on main body 110 at the intersection of the two bore segments 112, 114. The mirror assembly axis 122 is disposed at a 45° angle to each of the two bore axes 116, 118. The main body is truncated to provide an exterior surface 124 at 45° to the axes 116, 118 against which the mirror assembly 120 is disposed and which bounds an opening 125 extending through the wall of the main body to the intersection of bore segments 112, 114. As can be seen the axes 116, 118, 122 intersect at a common point.

The joint assembly also comprises a rotary coupling member 126 which is of general circular cylindrical shape. The member 126 has a portion 128 which is disposed within bore segment 112 and is journaled thereon coaxial with axis 116 by means of suitable bearing assemblies 130. An I.D. spacer 132 and an O.D. spacer 134 space the two bearings 130 axially apart. As viewed in FIG. 5, a shoulder 136 of coupling member 126 is disposed against the inner race of the left hand bearing 130, and a lock nut 138 is fastened onto the threaded right hand end 140 of member 126 to bear against the inner race of the right hand bearing. The outer race of the right hand bearing 130 bears against a shoulder 142 within bore segment 112 and an annular bearing retainer 144 is disposed against the outer race of the left hand bearing 130. The bearing retainer 144 is secured to the main body by means of a plurality of screws 146.

Rotary coupling member 126 is further provided with a radially outwardly directed circular flange 148 extending circumferentially around the exterior which radially overlaps bearing retainer 144. Flange 148 comprises one or more access apertures 150 for obtaining access to the heads of the screws 146 for fastening and unfastening the retaining ring. An annular seal 152 is located in a groove extending around the inner periphery of the retaining ring to provide a seal between the stationarily mounted retaining ring and the rotary coupling member.

As can be seen in FIG. 5, circular flange 148 is set slightly axially inwardly from the left hand end of rotary coupling member 126. This arrangement provides for the mating connection of additional structure (shown in broken lines). The illustrated structure comprises a complementary configured member 154 comprising a flange 156 disposed against flange 148 and a central circular recess 158 which fits onto the circular end 159 of coupling member 126 which extends beyond flange 148. The two flanges 156, 148 may be securely connected together by any suitable means such as a plurality of fasteners 160 passed through corresponding counterbored holes in one of the flanges and into complementary threaded holes in the other of the flanges. The additional broken line structure comprises a circular tube 162 fitted centrally onto a central circular projection 164 coaxial with axis 116 and secured thereto in any suitable manner such as by brazing, welding or by use of fasteners. Thus with this construction tube 162 and rotary coupling member 126 are rotatable as a unit about axis 116 relative to main body 110. It can be appreciated that this rotary coupling endows the joint assembly with the rotational capability indicated by the double headed arrows in FIGS. 1 through 3 and described above.

Where bore segment 114 opens to the exterior of main body 110, it is adapted to connect to structure 169 shown in broken lines. The broken line structure is configured identical to the exterior connecting structure of rotary coupling member 126, and hence the mating structure on main body 110 is configured complementary thereto. Specifically, main body 110 is provided with a counterbore 170 which is dimensioned to receive a circular projection of structure 169 corresponding to projection 159 at the end of rotary coupling member 126. The exterior surface of main body 110 surrounding counterbore 170 is provided with a mounting surface 172 against which a flange of structure 169 corresponding to circular flange 148 of rotary coupling member 126 is disposed. This organization allows two joint assemblies to be connected directly together in what may be described as cascading by connecting the rotary coupling member of one to the main body of the other whereby the axis 116 of one aligns with the axis 118 of the other. Connections may also be made between joint assemblies by means of interconnecting tubes appropriately configured for attachment to joint assemblies.

Mirror assembly 120 comprises a frame 174 and a mirror 176. Mirror 176 is removably mounted on frame 174 by a coolant distributor assembly 178 which itself removably mounts on frame 174.

An adjustment mechanism 180 is also provided between frame 174 and main body 110 to endow the joint assembly with the capability for precise positioning of mirror 176 at 45° to axes 116, 118. Further details of the mirror assembly and its associated components can be seen in FIGS. 6 through 12 as well as in FIG. 5.

Frame 174 is in the form of a generally circular element having an open center 181 of circular configuration coaxial with axis 122. This open center has a radially inwardly directed circular flange 182 at its innermost end. Mirror 176 is of a similar circular configuration fitting closely within the open center frame with the peripheral margin of the mirror being disposed against flange 182.

Coolant distributor assembly 178 comprises plural elements cooperatively associated. These plural elements are in the form of a circular cap, or cover, 184 and a circular base 186. Cap 184 telescopes onto the outer periphery of the base and a circular seal 188 is disposed between the two. The base and cap enclose an interior space through which coolant is conducted. Base 186 comprises central upstanding wall structure 187 having a circular configuration which divides the interior space into a central entrance chamber 190 and an annular exit chamber 192 surrounding central chamber 190. An inlet fitting 194 connects to base 186 at an inlet passage 196 which extends into central chamber 190. An outlet fitting 197 connects to base 186 at an outlet passage 198 which extends from chamber 192. The upstanding wall structure 187 contains one or more slots 199 adjacent the end wall of the cap.

In operation coolant is introduced from an external source through inlet fitting 194 and inlet passage 196 into chamber 190. The coolant overflows the chamber passing via slots 199 into the outer chamber 192. From there the coolant exits via outlet passage 198 and outlet fitting 197. The arrangement provides a flow of coolant across the end wall of cap 184 which is disposed directly against mirror 176. Although mirror 176 is highly reflective of an incident laser beam, there is always a certain minimal amount of the laser beam energy which is absorbed by the mirror as heat. Above certain power levels, usage of circulating coolant fluid through the distributor assembly is necessary in order to keep the mirror 176 at a suitable temperature. The illustrated arrangement provides a construction which is well suited for this purpose. The manner in which the coolant is circulated through the laser arm may comprise the distributor assemblies being connected in series with each other although it is possible to connect them in series, parallel, or any combination thereof.

The arrangement is also advantageous in that it provides for the convenient replacement of a mirror 176 if such becomes necessary. This capability is provided by making the distributor assembly separably mounted with respect to frame 174.

The separable mounting of the distributor assembly on frame 174 is accomplished by means of a circular retaining ring 200 which fits over the outer end of the distributor assembly and which is secured to frame 174 by means of a plurality of fasteners such as screws 202. The outer end of the base of the distributor assembly is provided with a circular recess 204. Spring structure 206 is disposed in this recess. With retaining ring 200 secured against frame 174, spring structure 206 acting against the retaining ring is effective to urge the distributor assembly inwardly and hence resiliently urge the outer peripheral margin of mirror 176 against flange 182. When the retaining ring is removed the distributor assembly can be removed from within the frame to provide access to mirror 176. The mirror can then be removed via the outer end of the frame opening. The mirror may be replaced and the distributor assembly reinstalled in the opposite fashion.

The adjustment mechanism 180 comprises an adjustable shim 210. Details of adjustable shim 210 are contained in FIGS. 8 through 11 which show various views of the adjustable shim by itself.

Referring to these four figures it can be seen that adjustable shim 210 has an annular shape having a circular I.D. 212 and a generally square shaped O.D. 214 with the four corners of the O.D. being 45° chamfered at 216. The four corners are configured in a special way to provide the shimming capability. As can be seen from consideration of FIGS. 9 and 11 the adjustable shim is of nominal uniform thickness indicated by the arrow 218 except at the four corners which are provided with lands 220 on one face of the shim and this locally increases the thickness as indicated by the arrow 222.

The shim comprises in each of the four corners a threaded bore 224 and an unthreaded partial counterbore 226. Each bore and partial counterbore has an axis 228 disposed on a radial relative to axis 122, the adjustable shim being coaxial with axis 122. The four axes 228 are spaced 90° apart. Each corner is further provided with a slot-like structure identified by the general reference numeral 230. This slot-like structure intersects what otherwise would be a full counterbore 226, thereby creating the partial counterbore. The partial counterbore 226 does not have a full 360° extent about axis 228 but rather on one side of the slot-like structure has an extent of slightly more than 90° and on the opposite side a much lesser extent as best seen in FIG. 10. These extents are designated 226a and 226b respectively.

The slot-like structure 230 may be considered as comprising first and second slot portions 232, 234. Slot portion 232 is wider, as measured axially of adjustable shim 210, but shallower than slot portion 234. Slot portion 232 is disposed axially in relation to the thickness of the adjustable shim such that the width of the slot portion 232 is approximately symmetrically disposed with respect to axis 228. The slot portion 234 is disposed to the side of slot portion 232 toward the face containing lands 220. With this arrangement, each land 220 is supported in the manner of a cantilever extending outwardly from the base of slot portion 234.

Adjustment mechanism 180 further comprises adjustment elements which are cooperatively associated with adjustable shim 210. These adjustment elements comprise threaded insert assemblies 240. A longitudinal view of such a threaded insert assembly 240 appears in FIG. 12. The threaded insert comprises a headed fastener 241 having a threaded shank 242, an insert element 246 through which shank 242 is passed, a washer 248 fitted onto shank 242, and a nut 244 threaded onto shank 242 and tightened to secure insert element 246 on fastener 241 as shown. For the adjustable shim, four such insert assemblies are used, one at each of the four corners.

Shank 242 of each insert assembly threads into the corresponding threaded bore 224 to dispose nut 244, washer 248 and the immediately adjacent portion of insert element 246 within the partial counterbore. Insert element 246 has a frusto-conically tapered outer surface 247 which tapers radially outwardly in the direction away from the adjustable shim when the insert assembly is cooperatively associated therewith. The outside diameter of frusto-conically tapered surface 247 is dimensioned such that when shank 242 has been advanced a predetermined amount into bore 224, the O.D. of the insert element will contact the circular outer edges of the counterbore segments 226a and 226b. Continued advancement of the insert element inwardly toward axis 122 will cause a slight deflection of the cantilever in the sense indicated by the arrow 256. The amount of the deflection will be a function of depth to which the insert element has been operated. As can be appreciated, this will be effective to change the dimension 222 at the corresponding corner.

Because of such shim adjustments at the four corners, a very precise shimming of the mirror assembly on the main body is obtainable. In this way, the plane of the mirror may be positioned at a true 45° angle to the axes 116, 118 so that a laser beam incident along one of the two axes 116, 118 is reflected at exactly 90° along the other. This adjustment capability becomes increasingly important as the length of the segment of travel of the reflected beam increases. For example, in the illustrated arm the precision adjustment capability is especially important for the two longest tubes 66 and 72.

The shimming procedure is a particularly convenient one because shimming can be accomplished without inserting or removing any separate shim elements. The insert assemblies will have a sufficient depth of threaded engagement of shank 242 with threaded bore 224 so that accidental separation of an insert assembly from adjustable shim 210 is virtually precluded.

The preferred construction for the shim assembly is from SAE 1095 steel, or equal, preferably black oxide coated. Insert element 246 is preferably a hard metal carbide of the type used to lock cutting inserts on cutter bodies.

The mirror assembly is separably secured to main body 110 by means of four screws 260 shown in FIG. 6 arranged 90° apart about axis 122. Counterbored holes are provided through frame 174 to receive the screw heads with the screw shanks passing through and into corresponding tapped holes in surface 124 of main body 110 against which the mirror assembly is disposed.

As shown in FIG. 6 the relative position of adjustment mechanism 180 about axis 122 is such that the four corners are disposed circumferentially between screws 260 so as to allow the screw shanks to clear the sides of adjustable shim 210.

The shimming procedure may comprise a slight loosening of one or more of screws 260 so as to allow the shimming adjustment to be performed. Once the proper shimming adjustment has been obtained by actuation of the appropriate insert assembly 240, screws 260 are tightened to secure the mirror assembly in the adjusted position.

Figure 7:
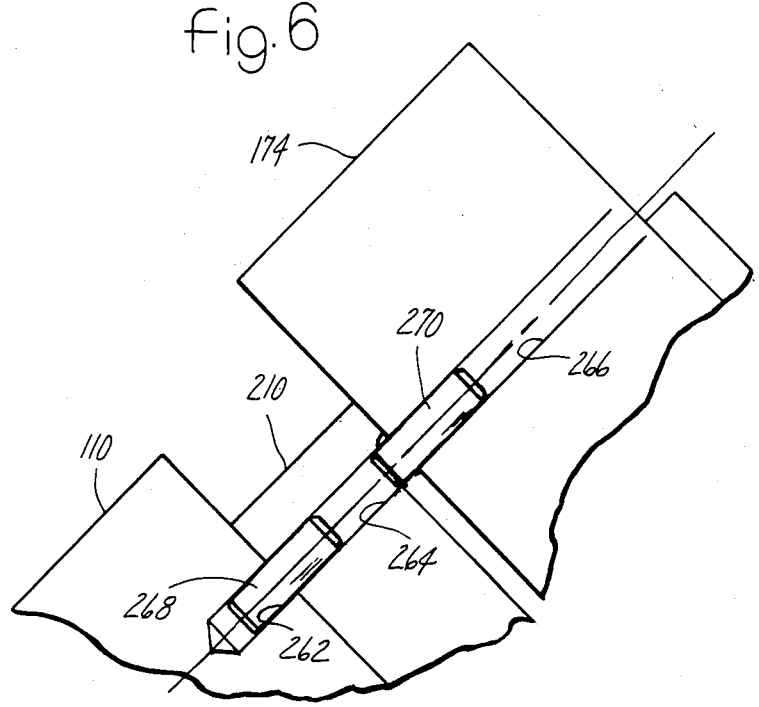
FIG. 7 is a fragmentary sectional view on an enlarged scale taken in the direction of arrows 7—7 in FIG. 6.

As an aid in holding the several parts together for assembly purposes holes 262, 264, 266 are provided in main body 110, adjustable shim 210 and frame 174 respectively for doweling of the three together by means of dowels 268, 270 such as shown in FIG. 7. The dowels are not intended to provide a precision fit as contemplated by the usual usage of dowels. Rather the dowels are deliberately slightly loose so as to permit the proper shimming adjustment to be performed, yet they do provide for the mirror assembly components to be substantially aligned for assembly purposes.

Figure 13:
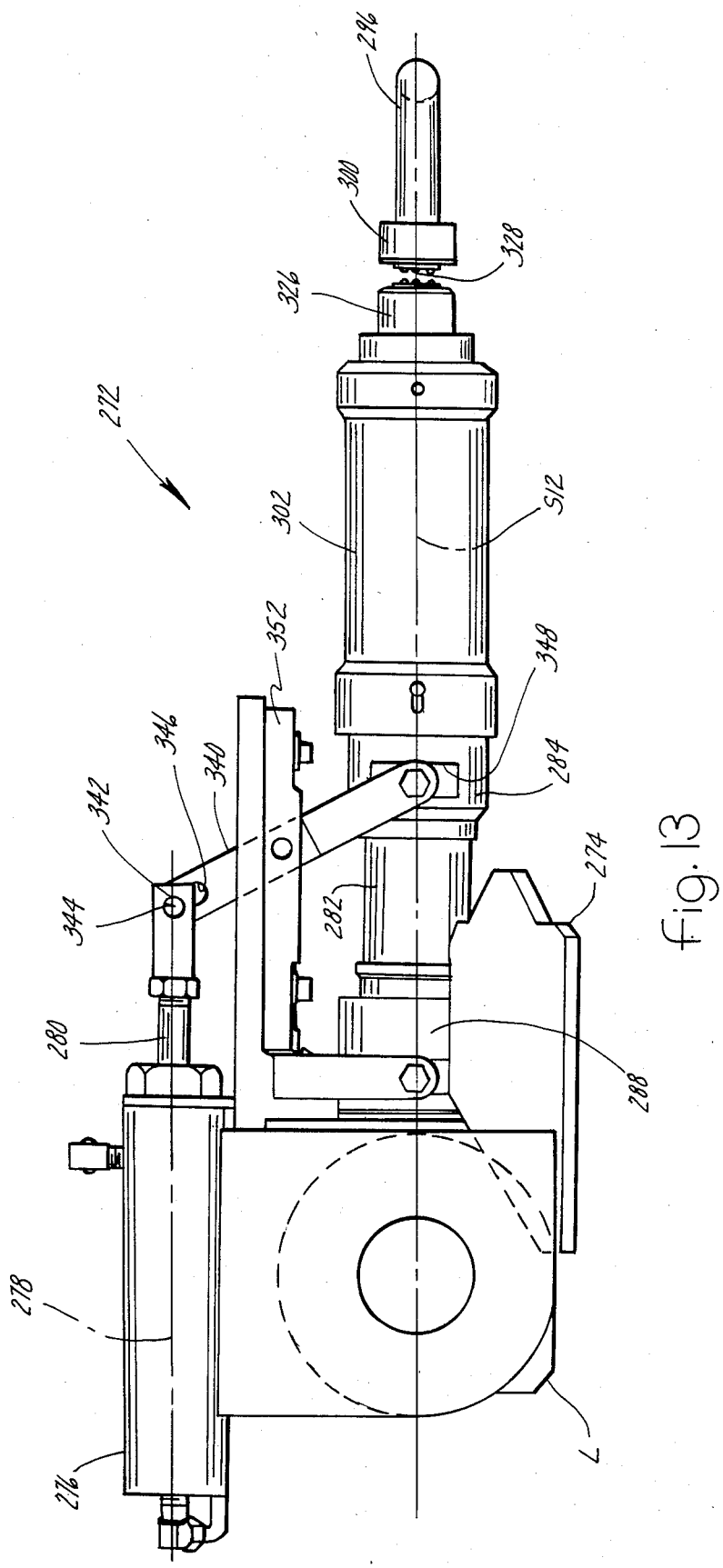
FIG. 13 is a longitudinal view of another portion of the laser arm of FIG. 1.
Figure 14:
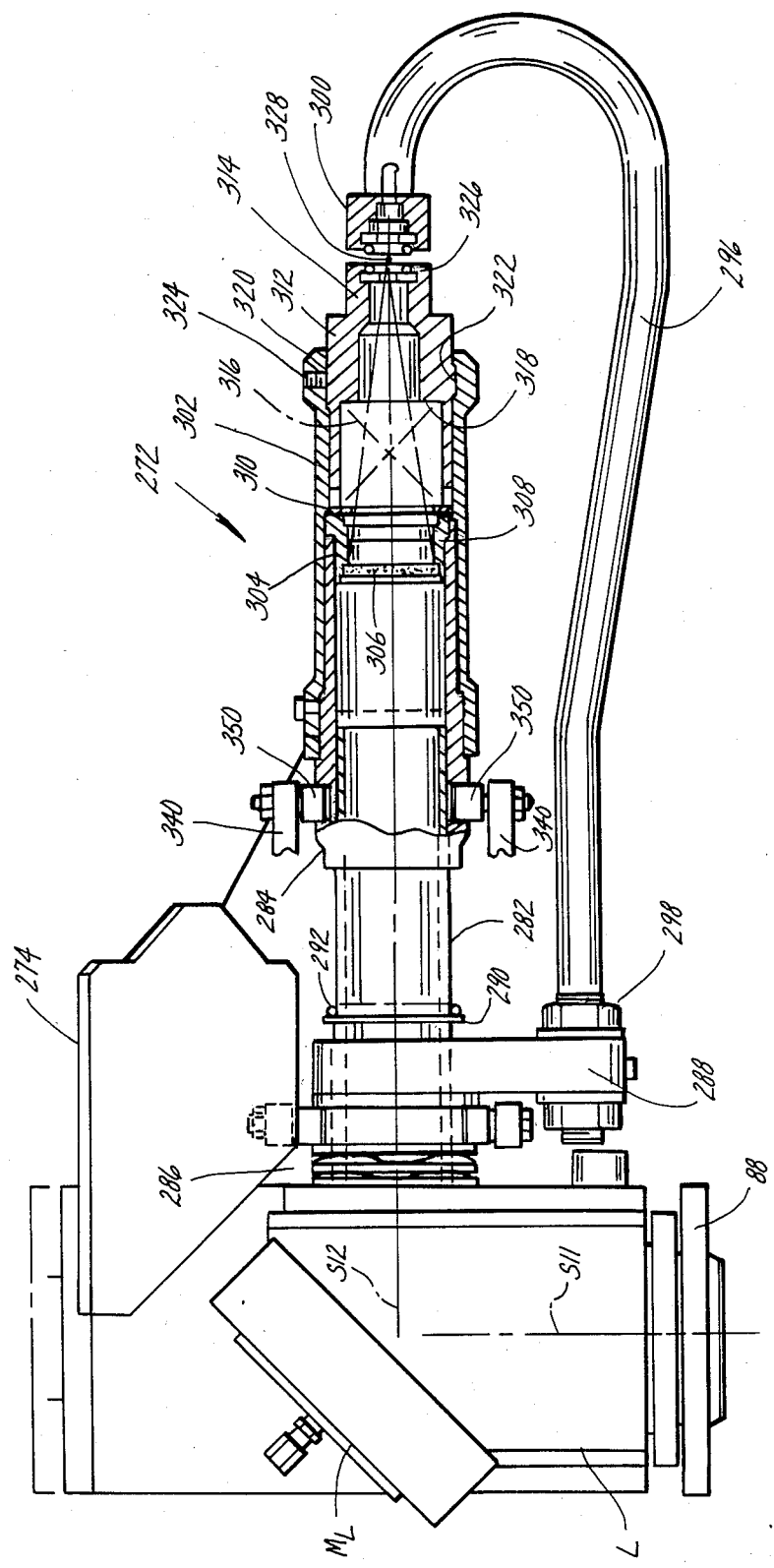
FIG. 14 is a longitudinal view of the same portion as in FIG. 13 but with the view rotated 90° from that shown in FIG. 13.

FIGS. 13 and 14 illustrate a focusing clamp 272 which establishes the point of utilization of the laser beam after passing through the various segments of the articulated arm. The focusing clamp attaches to the wrist of the robot arm by means of a weldment structure 274. Hence, the focusing clamp is caused to follow all motions which are executed by the robot.

Weldment structure 274 provides for attachment of the main body 110 of joint assembly L to the robot hand. The weldment structure also serves to mount certain other portions of the focusing clamp.

A cylinder 276 mounts on the weldment structure with its axis 278 parallel to beam path segment S12. The cylinder rod 280 is operable along axis 278 between a fully extended and a fully retracted position. The drawing figures illustrate rod 280 extended slightly from its fully retracted position. A tube 282 is fastened to the main body 110 of joint assembly L coaxial with the axis 118 of the joint assembly. One end of a further tube 284 telescopes over the end of tube 282 opposite the attachment of tube 282 to joint assembly L. The two tubes have a close telescopic fit whereby the outer tube 284 is guided for coaxial displacement on the inner tube 282.

Before the outer tube 284 is telescoped over the free end of inner tube 282, a stack 286 of alternating flat and wave washers and a slide 288 are fitted over the outside of the inner tube 282. Slide 288 is capable of a limited amount of axial displacement on inner tube 282. The stack of alternating flat and wave washers is disposed between slide 288 and the mounting flange by which tube 282 mounts on the main body of joint assembly L. After slide 288 has been assembled onto the body of tube 282, a pair of rings 290, 292 are inserted onto tube 282 and brought against a shoulder on the wall of the tube as illustrated in the drawing figures.

A clamping bar 296 attaches to slide 288 at 298. The clamping bar has a shape which can be best seen in FIG. 14. The distal end of the bar is in the form of a 180° return bend which returns to be coaxial with beam path segment S12. This distal end terminates in a tip assembly 300 which will be described in greater detail later on.

A still further tube 302 is fitted over and secured to tube 284. Inserted into the right hand end of tube 284 as viewed in FIG. 14 is a lens mounting assembly 304. The lens mounting assembly comprises a convex focusing lens 306 supported within mounting structure 308. The mounting structure has an annular shape and threads into the end of tube 284. A washer 310 is disposed at the right hand end of the lens mounting assembly.

A spring and bearing mount 312 fits within the right hand end of tube 302 as can be seen in FIG. 14. Spring and bearing mount 312 comprises a body 314 of generally tubular shape with successive bore sections. A spring 316 is disposed within the interior of body 314 between a shoulder 318 and washer 310. The O.D. of body 314 is threaded at 320 so that the spring and bearing mount has a threaded engagement with a complementary thread 322 fashioned internally of tube 302 at the right hand end thereof as viewed in FIG. 14. The threaded engagement between spring and bearing mount 312 and tube 302 provides for relative axial positioning of the spring and bearing mount to focusing lens 306, with spring 316 increasingly compressing as body 314 is more fully threaded into tube 302. Once a desired adjustment has been obtained, a set screw 324 may be operated to lock the two against relative rotation.

Mount 312 has a tip assembly 326 confronting tip assembly 300. The tip assemblies coaprise ball bearing assemblies having mutually confronting freely rotatable races. As will become more apparent these are useful in the operation of the focusing clamp assembly when engaging a workpiece. Furthermore as can be seen in FIG. 14, the organization and arrangement is such that the adjustment of mount 312 will be effective to position tip assembly 326 in desired relation to the focus 328 of the laser beam.

The two confronting tip assemblies are operable along the axis of beam segment S12 toward and away from each other. The manner by which the two confronting tips are operated involves the use of cylinder 276 and operating mechanism associated with slide 288 and tube 284.

The operating mechanism comprises an operating level 340 having one end operatively coupled with a pivot fitting 342 attached to the end of cylinder rod 280. This pivot fitting 342 comprises a pivot pin 344 which engages a longitudinal slot 346 in lever 340. The end of lever 340 opposite slot 346 is yoke-shaped to straddle opposite sides of tube 284. Tube 284 is provided with slots 348 on diametrically opposite sides which are engaged by inwardly directed rollers 350 on the yoke-shaped end of lever 340.

Intermediate its points of connection with rod 280 and tube 284, lever 340 is pivotally mounted on a member 352 which is slideable axially on the weldment structure 274. The connection between member 352 and lever 340 is a slot and pin type connection. The construction and arrangement of the focusing clamp is such that when the cylinder rod 280 is extended, i.e. moved to the right in FIGS. 13 and 14, tube 284 is urged to the left, i.e. telescopes more fully onto tube 282. This results in increasing separation of the confronting tips 300, 326. When cylinder rod 280 is retracted, the opposite occurs.

In use, a portion of a workpiece being operated on by the focusing clamp will be disposed between the two confronting tip assemblies. Cylinder 276 is then operated to retract rod 280. This causes tubes 284 and 302 to extend while slide 288 remains stationary.

As the two tip assemblies approach each other, a point will be reached where a tip assembly abuts one side of the workpiece. When this happens, an increased resistive force will be encountered. This increased resistive force is reacted by the pivotal connection of the link with the bracket 352. So long as the resistive force is low enough, the reaction on bracket 352 will be insufficient to compress the wave washers of stack 286 so that the focusing tip continues extending, now displacing the workpiece along with it until the two tip assemblies clamp the workpiece between them. Whenever the resistive force becomes sufficiently great, the wave washers of stack 286 will begin to yield so that the final increment of retraction of the cylinder rod will cause the two confronting tips to forcefully clamp the workpiece between them with the wave washers of the stack being compressed. Hence, with the focusing clamp, a workpiece need only be approximately positioned between the two confronting tips, and the focusing clamp assembly by virtue of its equalizing nature will always clamp onto the part to accurately hold it with the focal point of the focussed laser beam being at the desired location. For example this would be approximately half way between the confronting ends of the tips where the workpiece comprises two sheets of equal thickness being joined by laser welding.

Based upon the foregoing description the reader will perceive that the articulated arm structure forms an enclosed path for the laser beam from laser 22 to focussing clamp 272. The provision of the mirror assembly on each joint enables precise alignment between an incident and a reflected laser beam at a joint whereby the laser beam is accurately transmitted through the various path segments of the articulated laser arm. The pivoting capability provided by the pivotal joints enables the articulated arm structure to follow the commands of robot 34 in positioning the focusing clamp on a workpiece.

In the illustrated embodiment of a laser joining operation, the robot is effective to position the focusing clamp on a workpiece. The focusing clamp is positioned by the robot and operated to clamp onto a workpiece to perform desired joining operations. The provision of the bearing assemblies at the confronting tips of the focusing clamp facilitates movement of the clamp on a workpiece when either or both of the tips comes into contact with a workpiece.

The construction of each mirror assembly provides a number of important advantages. In addition to the mirror adjustment capability provided by the adjustable shim mechanism, the coolant distributor assembly co-functions to provide both cooling of the mirror and a replacable mounting of the mirror on the mirror frame. Depending upon the laser power level, circulation of coolant through the coolant distributor assemblies may or may not be required. Where higher power levels are involved, coolant will typically be circulated through the distributor assemblies in either a series or parallel manner as explained above.

The illustrated construction for the joints enables common joints to be fabricated for use in articulated arm systems having geometries different from that of the illustrated embodiment. Different geometries can be developed by either connecting one joint to another joint either directly or through the use of an intervening tubular conduit of desired length. While the joints have been illustrated as having a 90° angular relationship between their bore segments with a mirror assembly positioned at the intersection at a 45° relationship to the incident and reflected beams, it is possible that joint assemblies could be fabricated with other than this particular angular relationship if desired; the 90° relationship is however an especially convenient one which is adapted for most applications. Also because the joint assemblies are identical, they and their component parts are readily interchangeable.

While a preferred embodiment of the invention has been disclosed, it will be appreciated that principles of the invention may be applied to other embodiments.

What is claimed is:

1. A focusing clamp for use at the end of articulated arm structure associated with a laser wherein the laser beam is conducted via the articulated arm structure to the focusing clamp, said focusing clamp comprising a tubular element through which the laser beam is conducted and which has a proximal end through which the laser beam enters and a distal end through which the laser beam exits, a convergent focusing lens on said tubular element between its proximal and distal ends for focusing the laser beam to a point of utilization, two confronting tips on opposite sides of the point of utilization, means for mounting one of said tips on the distal end of said tubular element so that the focused laser beam can pass to the point of utilization, means including an operating mechanism to provide for relative movement of said tips toward and away from each other for clamping and releasing a workpiece at the point of utilization, and in which each said tip comprises a corresponding bearing assembly with the bearing assemblies being coaxial with the focused laser beam and in confronting relationship to each other across the point of utilization to facilitate movement across a workpiece disposed between the tips.

2. A focusing clamp for use at the end of articulated arm structure associated with a laser wherein the laser beam is conducted via the articulated arm structure to the focusing clamp, said focusing clamp comprising: a pair of tubular elements which are telescopically engaged, and through which the laser beam is conducted, one of said tubular elements being mounted on the articulated arm structure and the other of said tubular elements being longitudinally shiftable on said one tubular element, a convergent focusing lens on said other tubular element for focusing the laser beam to a point of utilization, two confronting tips on opposite sides of the point of utilization, means for mounting one of said tips on said other tubular element so that the focused laser beam can pass to the point of utilization, means for moveably mounting the other of said tips on said one tubular element to provide for relative movement of said other tip with respect to said one tubular element, and an operating mechanism operatively coupled with said other tubular element and with said means for moveably mounting said other tip on said one tubular element, said operating mechanism comprising means for causing the extension of said other tubular element and hence said one tip from said one tubular element without any accompanying change in the relative position of said other tip with respect to said one tubular element until a predetermined resistance is encountered, said operating mechanism thereafter being effective to cause said other tip to move toward said one tip.

3. A focusing clamp as set forth in claim 2 in which each said tip comprises a corresponding bearing assembly with the bearing assemblies being in confronting relationship to each other to facilitate movement across a workpiece disposed between the tips.

4. A focusing clamp as set forth in claim 2 in which said one tip is mounted on said other tubular element by a third tubular element, said third tubular element fitting coaxially on one end of said other tubular element and said one tip being mounted at the end of said third tubular element opposite said other tubular element.

5. A focusing clamp as set forth in claim 4 in which said one tip comprises a generally tubular body which is adjustably positionable with respect to said third tubular element, said lens being disposed in lens mounting structure at the end of said other tubular element on which said third tubular element fits, resilient means interacting between said one tip and said lens mounting structure to resiliently urge said lens mounting structure against said other tubular element.

6. Apparatus for directing a laser beam from a stationary laser to a movable point of utilization comprising an articulated arm structure forming an enclosed path through which the laser beam is conducted, said articulated arm structure comprising first and second linear conduits forming segments of said path, a first pivot joint for pivoting said first conduit on one part of said apparatus about a first axis, a second pivot joint between said first conduit and said second conduit spaced lengthwise of said first conduit from said first pivot joint, said second pivot joint pivoting said second conduit relative to said first conduit about a second axis spaced from said first axis, a third pivot joint between said second conduit and another part of said apparatus spaced lengthwise of said second conduit from said second pivot joint, said third joint pivoting said another part of said apparatus relative to said second conduit about a third axis spaced from said first and second axes, mirrors at said three pivot joints arranged to cause a laser beam entering said first pivot joint from said one part of said apparatus to be conducted on through said first conduit, said second pivot joint, said second conduit, and said third pivot joint to said another part of said apparatus, said three pivot joints being so arranged that a common plane passes through said three pivot joints for all positions of articulation, and in which said another part of said apparatus comprises further articulated arm structure through which the laser beam is conducted, said another part of said apparatus terminating in utilization means constituting the utilization point of the laser beam, and further including a robot having multiple degrees of freedom and means operatively coupling said utilization means with said robot, said robot being operable to selectively position said utilization means over said degrees of freedom with said articulated arm structures conforming to the motion imparted to said utilization means by said robot, and said further articulated arm structure comprises two further pivot joints and conduits, the first further pivot joint having an axis intersecting said third axis, the second further pivot joint having an axis intersecting the axis of said first further pivot joint, and mirrors associated with said further pivot joints and conduits for conducting the laser beam from said third pivot joint through said further conduits to said utilization means, and in which said utilization means comprises a focusing clamp mechanism.

7. Apparatus as set forth in claim 6 in which said focusing clamp mechanism comprises confronting tip assemblies and means for selectively moving said tip assemblies toward and away from each other to clamp and release a workpiece disposed between said tip assemblies, said tip assemblies including bearing assemblies to facilitate movement of the tip assemblies against workpieces.

8. For use in an articulated arm structure forming an enclosed path through which a laser beam is conducted, a joint comprising a main body having a bore defined by a longitudinal bore segment and a transverse bore segment disposed at an intersecting angle to said longitudinal bore segment, a mirror having its reflecting surface disposed at the intersection of said longitudinal and transverse bore segments to reflect a laser beam entering the joint via one of said bore segments along the other of said bore segments, a rotary coupling member having a bore coaxially disposed with respect to said longitudinal bore segment, means for journaling said rotary coupling member on said main body for relative rotation with respect to said longitudinal bore segment about their coaxis, said rotary coupling member having connecting structure of a given configuration adapted for mating connection with structure of complementary configuration, and said main body having connecting structure of said complementary configuration at said transverse bore segment adapted for mating connection with structure of said given configuration, in which said mirror is disposed within an open center frame separably mounted on said main body and including an adjustable shim mechanism between said frame and said main body for precisely adjusting the relationship of said reflecting surface to said longitudinal and transverse bore segments, and said mirror is replaceably mounted on said frame by a coolant distributor assembly disposed within the open center of said frame to exert a force on said mirror urging said mirror against an inwardly directed flange extending around the open center of said frame.

9. For use in an articulated arm structure forming an enclosed path through which a laser beam is conducted, a joint comprising a main body having a bore defined by a longitudinal bore segment and a transverse bore segment disposed at an intersecting angle to said longitudinal bore segment, a mirror having its reflecting surface disposed at the intersection of said longitudinal and transverse bore segments to reflect a laser beam entering the joint via one of said bore segments along the other of said bore segments, a rotary coupling member having a bore coaxially disposed with respect to said longitudinal bore segment, means for journaling said rotary coupling member on said main body for relative rotation with respect to said longitudinal bore segment about their coaxis, said rotary coupling member having connecting structure of a given configuration adapted for mating connection with structure of complementary configuration, and said main body having connecting structure of said complementary configuration at said transverse bore segment adapted for mating connection with structure of said given configuration, and in which said mirror is disposed within an open center frame separably mounted on said main body and including an adjustable shim mechanism between said frame and said main body for precisely adjusting the relationship of said reflecting surface to said longitudinal and transverse bore segments, said mirror is replaceably mounted on said frame by a coolant distributor assembly disposed within the open center of said frame to exert a force on said mirror urgining said mirror against an inwardly directed flange extending around the open center of said frame, and said adjustable shim mechanism comprises an annular shim member extending around said frame and disposed between said main body and said frame and having spaced apart points of shimming, said points of shimming comprising means operable in the radial direction relative to said annular shim member for affecting shimming between said frame and said main body.

10. For use in an articulated arm structure for conducting a laser beam to a point of utilization movable relative to a laser, a joint for changing the direction of the laser beam comprising a main body having a bore through which the laser beam is conducted and a mirror assembly on said main body for changing the direction of the laser beam through the joint, said mirror assembly comprising a mirror whose reflecting surface is disposed to change the laser beam direction, a frame containing said mirror, and means for mounting said frame on said main body comprising a one-piece adjustable shim member of annular shape extending around said frame and disposed between said frame and said main body, said shim member comprising spaced apart points of shimming having nominal thickness, each such point of shimming comprising slot-like structure fashioned in said shim member and configured for expansion in the direction of the thickness of said shim member so as to allow the overall dimension of the thickness of said shim member to be increased beyond its nominal thickness at each point of shimming, and adjustment means operatively associated with each slot-like structure and selectively actuable for causing the slot-like structure to be expanded in a desired amount to produce a desired shimming action between said frame and said main body and thereby shim said mirror.

11. A joint as set forth in claim 10 in which each such slot-like structure comprises slot means dividing the thickness of said adjustable shim member into axially spaced apart portions at each point of shimming, one of said axially spaced apart portions at each point of shimming exhibiting a cantilever type action to expand the nominal thickness of the shim member at the point of shimming in response to actuation of the corresponding adjustment means to expand the corresponding slot-like structure.

12. A joint as set forth in claim 11 in which each slot means comprises axially adjoining first and second slot portions, each said first slot portion having a given width as measured in the direction of the thickness of said shim member and a given depth and each said second slot portion having a lesser width but greater depth than the corresponding first slot portion, each said one of said axially spaced apart portions being disposed adjacent the corresponding second slot portion.

13. A joint as set forth in claim 12 in which each said adjustment means comprises a threaded element threaded into a threaded bore at the base of each first slot portion, and means on each such threaded element interacting with the corresponding axially spaced apart portions to effect the cantilever action of the corresponding point of shimming as the threaded element is advanced into the corresponding threaded bore.

14. A joint as set forth in claim 13 in which said means on each said threaded element comprises an insert having a frusto-conical wall which bears on diametrically opposite sides against the corresponding axially spaced apart portions.

15. A joint as set forth in claim 10 in which a plurality of fasteners arranged in a given pattern extend through said frame to said main body to secure said frame and said adjustable shim member in assembled relation on said main body, at least some of said fasteners being loosened when a shimming adjustment is performed, and said points of shimming being arranged in their own given pattern which is offset from the pattern of said fasteners.

16. A joint as set forth in claim 15 in which said adjustable shim member has a four sided outer perimeter, said points of shimming being at the four corners of said perimeter, said fasteners for securing said frame and adjustable shim member in assembled relation on said main body being disposed such that each fastener is dispersed radially outwardly of a corresponding side of the outer perimeter of said adjustable shim member and between the corresponding corners of the four sided outer perimeter.

17. For use in an articulated arm structure for conducting a laser beam to a point of utilization movable relative to a laser, a joint comprising a main body having a bore defined by a longitudinal bore segment and a transverse bore segment whose axes intersect at a common point, an opening through said main body to the intersection of said bore segments and a mirror assembly disposed at said opening with its axis intersecting said common point, said mirror assembly comprising a mirror having a face surface and an obverse surface with said face surface being a reflecting surface which is disposed at said common point and serves to reflect an incident laser beam along the axis of one of said bore segments along the axis of the other of said bore segments, said mirror assembly comprising an open center frame having an inwardly directed flange said mirror being disposed within the open center of said frame with a marginal portion of said mirror against said flange, and a coolant distributor assembly disposed within the open center of said frame against said mirror and means for removably retaining said distributor assembly within the open center of said frame to in turn retain said mirror against said flange, said coolant distributor assembly comprising a wall disposed in surface-to-surface contact against the obverse surface of said mirror and means for causing coolant to flow across said wall internally of the distributor assembly to thereby promote cooling of the mirror by heat transfer through said wall, and in which said coolant distributor assembly is removably retained within the open center of said frame by means of retention structure attached to said frame and including resilient means disposed between said retention structure and said coolant distributor assembly exerting a force on said coolant distributor assembly which in turn urges said mirror against said flange.

18. A joint as set forth in claim 17 in which said coolant distributor assembly comprises a central internal zone generally coaxial with the axis of said mirror assembly and a peripheral zone bounding said central zone, said two zones being separated by an annular wall extending axially of said mirror assembly, and aperture means in said annular wall contiguous with said first-mentioned wall, means for introducing coolant into one of said zones and means for conducting coolant away from the other of said zones, said aperture means serving to cause coolant introduced into said one zone to pass to the other zone by flowing across first-mentioned wall thereby to cool the mirror.

19. A joint as set forth in claim 17 in which said retention structure comprises a retention ring removably mounted on said frame with a portion of said ring overlapping said coolant distributor assembly to thereby removably mount same on said frame.

20. For use in an articulated arm structure for conducting a laser beam to a point of utilization movable relative to a laser, a joint for changing the direction of the laser beam comprising a main body having a bore through which the laser beam is conducted and a mirror assembly on said main body for changing the direction of the laser beam through the joint, said mirror assembly comprising a mirror whose reflecting surface is disposed to change the laser beam direction, a frame containing said mirror, and means for mounting said frame on said main body comprising a one-piece adjustable shim member disposed between said frame and said main body, said shim member comprising a point of shimming having a nominal thickness which comprises slot-like structure fashioned in said shim member and configured for expansion in the direction of the thickness of said shim member so as to allow the overall dimension of the thickness of said shim member to be increased beyond its nominal thickness at the point of shimming, and adjustment means operatively associated with said slot-like structure and selectively actuable for causing the slot-like structure to be expanded in a desired amount to produce a desired shimming action between said frame and said main body and thereby shim said mirror 21. A joint as set forth in claim 20 in which said adjustable shim member is of annular shape extending around said frame, and contains plural points of shimming having such slot-like structure and adjustment means.

22. A joint as set forth in claim 20 in which said slot-like structure is defined by axially adjoining first and second slot portions, said first slot portion having a given width as measured in the direction of thickness of said shim member and a given depth and said second slot portion having a lesser width but greater depth than said first slot portion.

23. A joint as set forth in claim 22 in which said adjustment means comprises a threaded element threaded into a threaded bore at the base of said first slot portion, and means on said threaded element interacting with spaced apart portions of said shim member on opposite sides of said slot-like structure to effect cantilever action of one of said spaced apart portions to expand the thickness of the shim member at the point of shimming.

* * * * *